United States Patent
Amatucci et al.

[11] Patent Number: 5,695,887
[45] Date of Patent: Dec. 9, 1997

[54] CHELATION TREATMENT FOR REDUCED SELF-DISCHARGE IN LI-ION BATTERIES

[75] Inventors: Glenn G. Amatucci, Raritan, N.J.; Alexandra Blyr, Amiens, France; Jean-Marie Tarascon, Martinsville, N.J.

[73] Assignee: Bell Communications Research, Inc., Morristown, N.J.

[21] Appl. No.: 645,018

[22] Filed: May 9, 1996

[51] Int. Cl.[6] ............................................. H01M 2/14
[52] U.S. Cl. ........................ 429/48; 429/137; 29/623.5; 427/220
[58] Field of Search .................... 429/48, 137, 215; 29/623.5; 427/220

[56] References Cited

U.S. PATENT DOCUMENTS

| | | | |
|---|---|---|---|
| 5,082,811 | 1/1992 | Bruno | 427/220 X |
| 5,192,629 | 3/1993 | Guyomard et al. | 429/197 |
| 5,425,932 | 6/1995 | Tarascon | 423/599 |
| 5,460,904 | 10/1995 | Gozdz | 429/192 |
| 5,547,778 | 8/1996 | Fauteux et al. | 429/137 X |

*Primary Examiner*—Stephen Kalafut
*Attorney, Agent, or Firm*—Lionel N. White; Joseph Giordano

[57] ABSTRACT

The extent of self-discharge of rechargeable Li-ion secondary batteries is significantly reduced by treatment of $LiMn_2O_4$ intercalation compound electrode material with a chelating agent, such as acetylacetone. This treatment decreases the incidence of non-coordinated Mn-ion sites which can lead to battery electrolyte decomposition and resulting loss of battery capacity. The treatment, which also includes annealing at about 400° C. to 800° C., further prevents such decomposition by varying the surface area and topography of the potentially catalytic electrode material.

16 Claims, 5 Drawing Sheets

CHELATION TREATMENT FOR REDUCED SELF-DISCHARGE IN LI-ION BATTERIES

BACKGROUND OF THE INVENTION

This invention relates to a rechargeable lithiated intercalation battery cell comprising a negative electrode, a non-aqueous electrolyte, and a positive electrode, and, particularly, to such a cell which exhibits a greatly reduced level of self-discharge by virtue of a surface-passivating chelating agent treatment of the lithiated intercalation composition particulates comprising the positive electrode.

Recent advances in rechargeable electrolytic battery cell technology have provided cells in which lithium metal is replaced with a material capable of reversibly intercalating lithium ions, thereby providing a so-called "rocking chair" cell, or lithium-ion intercalation cell, in which lithium ions "rock" between the intercalation electrodes during the charging/recharging cycles. Such a lithium metal-free "rocking chair" cell may thus be viewed as comprising two lithium-ion-absorbing electrode "sponges" separated by a lithium-ion conducting electrolyte usually comprising a $Li^+$ salt dissolved in a non-aqueous solvent or mixture of such solvents. This type of cell has been described by various investigators, including Murphy et al., *J. Electrochem. Soc.*, 126,349 (1979); Lazzari et al., *J. Electrochem. Soc.*, 127 773 (1980); Armand, in "Materials for Advanced Batteries," Murphy et al., eds., Plenum Press, New York, p. 145 (1980); and Guyomard et al., U.S. Pat. No. 5,192,629.

The output voltage of a Li-ion cell is determined by the difference between the electrochemical potential of Li within the two lithium sponges. Thus, to obtain a large output voltage and large energy values, one needs to employ as positive and negative electrodes lithium sponges that can intercalate lithium at high and low potential, respectively. Among the materials which can replace lithium metal as the negative electrode, carbon provides an advantageous compromise between a large specific capacity and reversible cycling behavior. Positive electrode materials suitable in such lithium-ion cells are the layered $LiCoO_2$ and $LiNiO_2$ intercalation compounds, and the three-dimensional spinel phase $Li_{1+x}Mn_2O_4$.

A common feature of rechargeable Li-ion cells based on these oxides as positive electrodes is that they deintercalate lithium ions at an average potential of 4 V, and, therefore, must be charged up to voltages greater than 4 V so as to utilize their full capacity. An inherent problem with this lithium ion technology is related to the use of highly oxidizing positive electrodes and their high charging voltages, namely, the risk of self-discharge. This self-discharge phenomenon, attributed in part to catalyzed electrolyte decomposition by Guyomard et al., *Journal of Power Sources*, 54, 92 (1995), can, even at low levels, jeopardize cycle life and capacity, as well as the safety of the cells.

Attempts to control the deleterious electrolyte decomposition, such as by elevating decomposition reaction threshold temperatures, as suggested in Japanese Application No. 7-192720, or by neutralizing acidic impurities, as in U.S. Pat. No. 4,465,747, have not, however, proven significantly successful. Therefore, there remained a need in the industry for a rechargeable, lithium intercalation battery cell which is resistant to self-discharge, even at elevated temperatures up to about 55° C.

SUMMARY OF THE INVENTION

An object of the present invention is to provide a novel means for reducing self-discharge in secondary lithium intercalation battery cells. Another object of the present invention is to provide an improved lithium intercalation cell having reduced self-discharge and stable recharge capacity during storage at temperatures up to about 55° C.

These objects, among others, have been achieved in the present invention by means of a novel lithium intercalation cell in which the surfaces of aggregate lithiated intercalation composition particulates, such as $LiMn_2O_4$, comprising the positive cell electrode have been passivated by treatment with a chelating agent comprising any of a number of multidentate ligands. Such a treatment not only complexes the non-coordinated metals ions occurring at the surface of the intercalation compound, thereby limiting the degree of activity of the potentially catalytic particulate aggregates, but also forms on the particulates a layer of carbonaceous by-products which reduces their surface area while, further, providing a barrier which limits contact between those positive electrode particulates and the electrolyte.

In a preferred embodiment of the present invention, the particulate intercalation compound is contacted for a period of about 1.5 to 8 hours with a multidentate ligand chelating agent, such as the more preferred acetylacetone, to form the metal complex. The resulting composition is annealed at about 400° C. to 800° C. for a period of about 24 hours during which the chelating ligand is reduced to carbonaceous by-products which form a protective barrier layer upon the particulate surfaces.

Chelating agents useful in the present invention may be selected from the numerous such bidentate ligand compounds noted by Harris and Livingstone in *Chelating Agents And Metal Chelates*, Dwyer and Mellor, eds., Academic Press, 1964, p.95. These compounds are precursor to 4- to 6-membered chelate rings, such as dithiocarbamates, xanthates, and carboxylates; tropolonates, ethylenediamine, 2,2'-bipyridine, 1,10-phenan-throline, o-phenylenebis (dimethylarsine), and 1,2-bis(diphenyl-phosphine) ethane; and β-diketonates and salicylaldiminato.

Also useful are tri-, quadri-, penta-, and hexadentate ligands, such as the tridentate obligate planar terpyridene and acylhydrazones of salicylaldehyde, and flexible diethylene-triamine and bis(3-dimethylarsinylpropyl) methylarsine. Quadridentate ligands may include the open-chain, unbranched triethylenetetramine and β-diketonate Schiff bases; the macrocyclic porphyrins, phthalocyanine, bis-dimethylglyoximato, and Schiff bases; and the tripod ligands of the type $X(-Y)_3$, wherein X is N, P, or As, wherein Y is $R_2N$, $R_2P$, $R_2As$, RS, or RSe, and wherein the connecting chain is $(CH_2)_2$, $(CH_2)_3$, or o-phenylene. The penta- and hexadentate ligands include mono-and non-protonated ethylenediaminetetraacetate.

BRIEF DESCRIPTION OF THE DRAWING

The present invention will be described with reference to the accompanying drawing of which.

DESCRIPTION OF THE INVENTION

Rechargeable Li-ion battery cells of the present invention are preferably of the type generally described in U.S. Pat. No. 5,460,904, the disclosure of which is incorporated herein by reference. Such a battery cell comprises a unitary laminate of a positive electrode composition layer with an associated current collector member, an intermediate separator layer having incorporated therein a non-aqueous electrolyte, and a negative electrode composition layer with an associated current collector member. When initially assembled for lamination, the battery structure components typically include: as the positive electrode layer, a 300 μm thick film of 6 parts of carbon black and 56 parts by weight of a Li-ion intercalation compound, such as a $Li_xMn_2O_4$, wherein $0<x<2$, which has been treated according to the present invention to provide aggregative particulate coating, intimately dispersed in a binder matrix of 16 parts of an 88:12 vinylidene fluoride:hexafluoropropylene (PVdF:HFP) copolymer plasticized with 16 parts of dibutylphthalate (DBP); as the separator layer, an 85 μm thick film of 20 parts of colloidal silica intimately dispersed in 30 parts of the copolymer plasticized with 50 parts of DBP; and as the negative electrode layer, a 200 μm thick film of 56 parts of microbead coke and 3 parts of carbon black intimately dispersed in 15 parts of the copolymer plasticized with 23 parts of DBP.

After lamination, a completed battery cell may be processed as described in the noted patent by immersion in methanol to extract substantially all the DBP plasticizer from the electrode and separator matrix compositions. Subsequent activation of the cell, in the described manner, by immersion in an electrolyte solution of 1 M $LiPF_6$ in a 2:1 mixture of ethylene carbonate (EC) and dimethyl carbonate (DMC) prepares the cell for charge/discharge cycling.

Self-discharge of prior art charged secondary battery cells of this type during storage, particularly at temperatures in the range of about 55° C. or greater, appears to arise from the decomposition of the cell electrolyte which, in turn, is promoted by the catalytic action of the intercalation compound electrode component, e.g., $LiMn_2O_4$. This deleterious activity within a rechargeable battery cell is believed to proceed as:

(1) Electrolyte→Electrolyte$^+$+e$^-$ (Irreversible)

(2) $Mn_2O_4$+e$^-$+Li$^+$→$Li_xMn_2O_4$ (Reversible)

in which the latter reaction results in an immediate, yet recoverable, loss in available cell output, or capacity, while the former reaction, resulting in electrolyte decomposition, leads to permanent loss in cell capacity.

Figure 1:
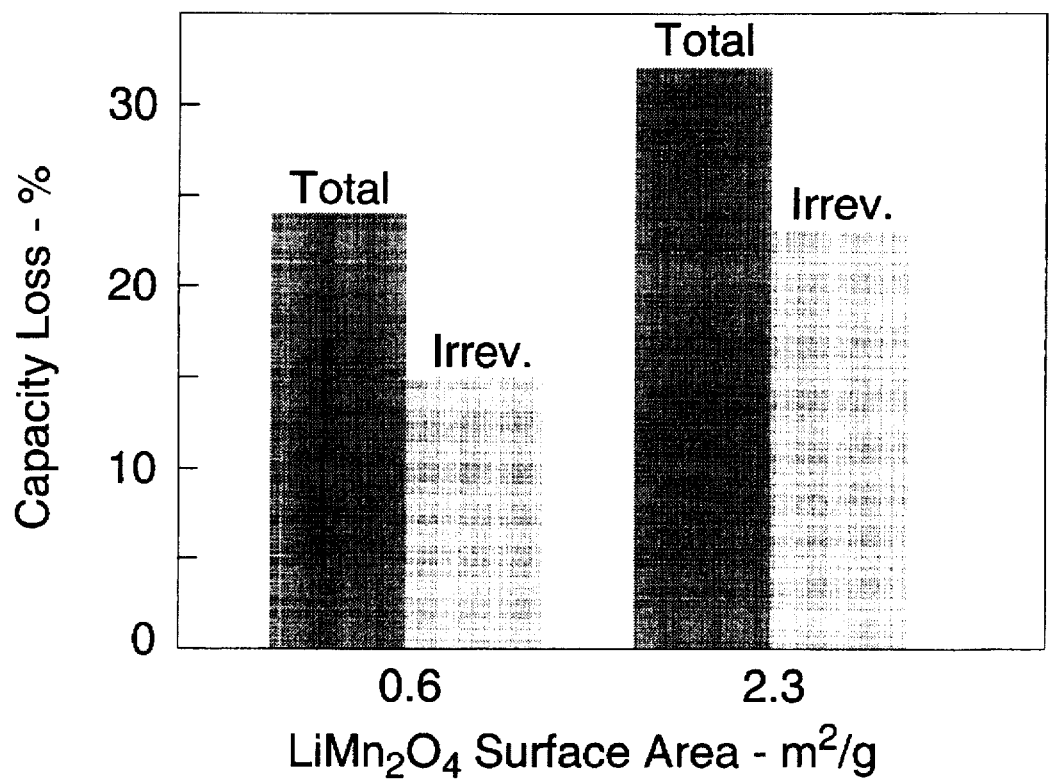
FIG. 1 is a chart depicting total and irreversible portions of the self-discharge of battery cells during storage at 55° C. as a function of the surface area density of $LiMn_2O_4$ electrode material.
Figure 2:
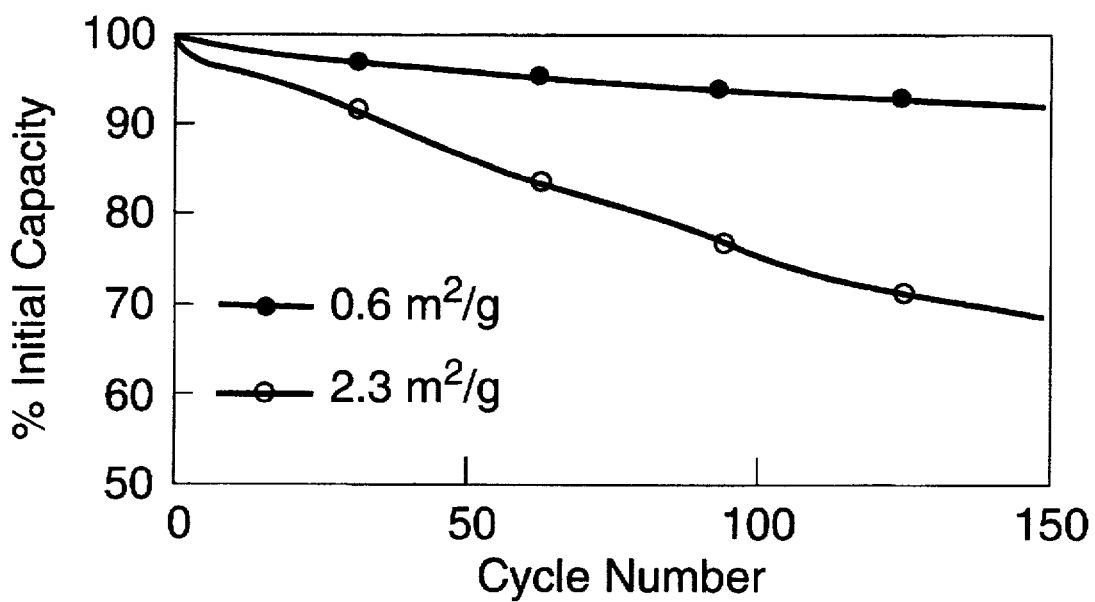
FIG. 2 is a graph depicting loss of initial capacity as a function of the number of charge/discharge cycles for cells having differing $LiMn_2O_4$ electrode surface area density.

The hypothesized catalysis of the irreversible electrolyte decomposition reaction by the positive electrode intercalation compound, such as $LiMn_2O_4$, gains support from the fact that, as is typical of surface-dependent catalytic reactions, the irreversible loss of cell capacity varies as a function of the surface area density of the aggregate particulates of that compound. This activity may be seen in FIGS. 1 and 2 which depict the greater total and irreversible capacity losses during charged storage at about 55° C., as well as the greater overall capacity loss over multiple charge/discharge cycles at that temperature, exhibited by a cell having greater $LiMn_2O_4$ electrode material surface area, i.e., smaller material particle size.

An initial approach to reducing the surface area density of $LiMn_2O_4$, for example, has been in the synthesis of the compound through the use of $Li_2CO_3$ and LiOH reactants, in preference to $LiNO_3$, since there are thus obtained $LiMn_2O_4$ powders of larger particle size having a surface area, as determined by common BET analysis, in the range of 0.2 $m^2/g$ to 0.8 $m^2/g$, as compared with the 3.6 $m^2/g$ surface area powders obtained with $LiNO_3$. Although somewhat successful, this expedient, even when supplemented with screening to remove a significant proportion of finer particles, did not sufficiently alleviate battery cell self-discharge and irreversible capacity loss.

It appeared, therefore, that an additional contributing factor in the catalysis of electrolyte decomposition could be the result of the likely existence of a significant number of non-coordinated component metal ions, e.g., Mn in $LiMn_2O_4$, at the surface of the electrode intercalation compound. Such ions would be capable of serving as active reaction centers promoting the degradation of the battery electrolyte and thereby accelerating self-discharge of the cell. Limiting the activity of these ions by complexing, such as with a chelating agent, was therefore investigated as a means of reducing the degree of electrolyte decomposition.

The results of such chelation treatment proved to be particularly effective, not only in the primary chelating effect itself which deterred the catalytic action of the non-coordinated Mn ions, but also in the secondary surface area reduction which occurred in a final annealing operation. It appears from scanning electromicrograph (SEM) examination that this post-heating step, which was originally intended as a means of eliminating the complexed ions, in effect carbonizes the chelating ligand and creates carbonaceous by-products which in turn form a film coating that attenuates the initial rough, high area surface initially resulting from solid state aggregation of fine intercalation compound particulates. In addition to this surface-reducing effect, the film provides a barrier which significantly restricts contact of the electrolyte with the potentially catalytic $LiMn_2O_4$ particles.

EXAMPLE 1

In order to test the utility of this procedure, a $LiMn_2O_4$ powder was prepared by annealing $Li_2CO_3$ and $MnO_2$ precursors according to the procedure described in U.S. Pat. No. 5,425,932. The resulting powdered intercalation compound, exhibiting a specific surface area density of about 0.8 $m^2/g$, was used in this and the other examples of this specification. About 12 g of the $LiMn_2O_4$ powder was stirred in about 100 mL of acetylacetone at room temperature for a period of about 3 hours and was then filtered, rinsed with acetylacetone, and finally rinsed with acetone. After air-drying, the powder was annealed at about 800° C. for 24 hours during which the chelated ligand was reduced to carbonaceous by-products which coated the surfaces of the $LiMn_2O_4$ particulates. After being slowly cooled to room temperature over the period of about 46 hours, the resulting material was readily comminuted to yield a fine powder which, under SEM examination, appeared to have lost its sharp particulate profile in favor of the smoother aggregate surface features of the carbonaceous barrier overcoating and which, upon BET analysis, exhibited a significant decrease in surface area density, e.g., from about 0.8 $m^2/g$ to 0.3 $m^2/g$.

Figure 3:
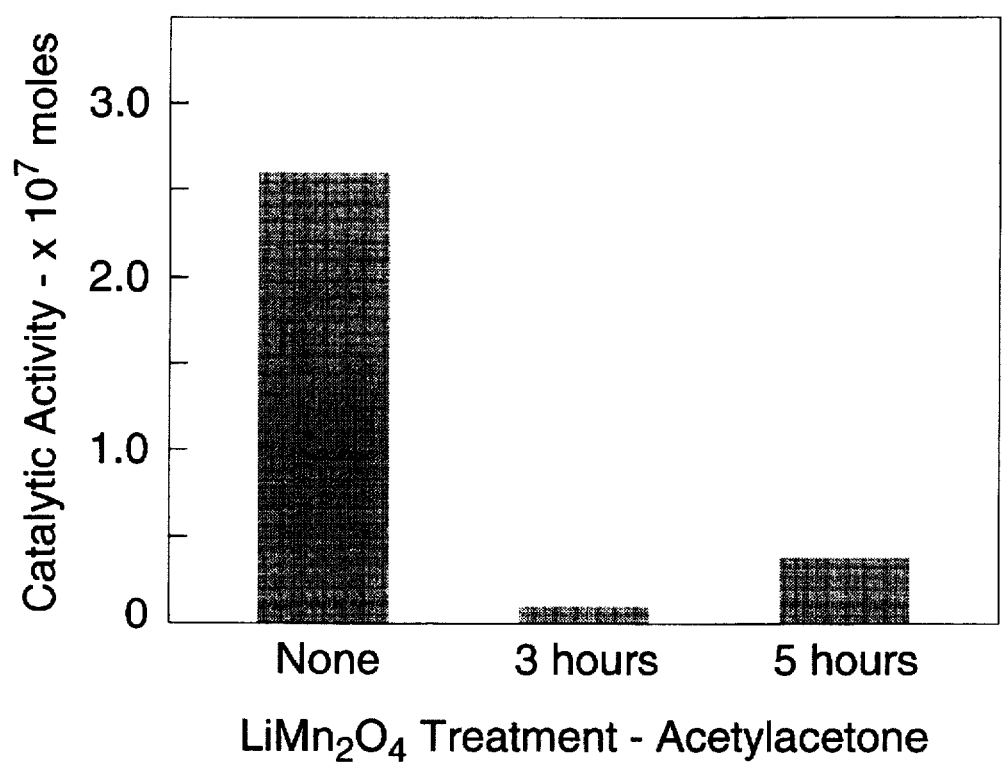
FIG. 3 is a chart depicting the catalytic activity of $LiMn_2O_4$ electrode composition, before and after treatment according to the present invention, as measured by catalytic conversion of CO to $CO_2$.
Figure 4:
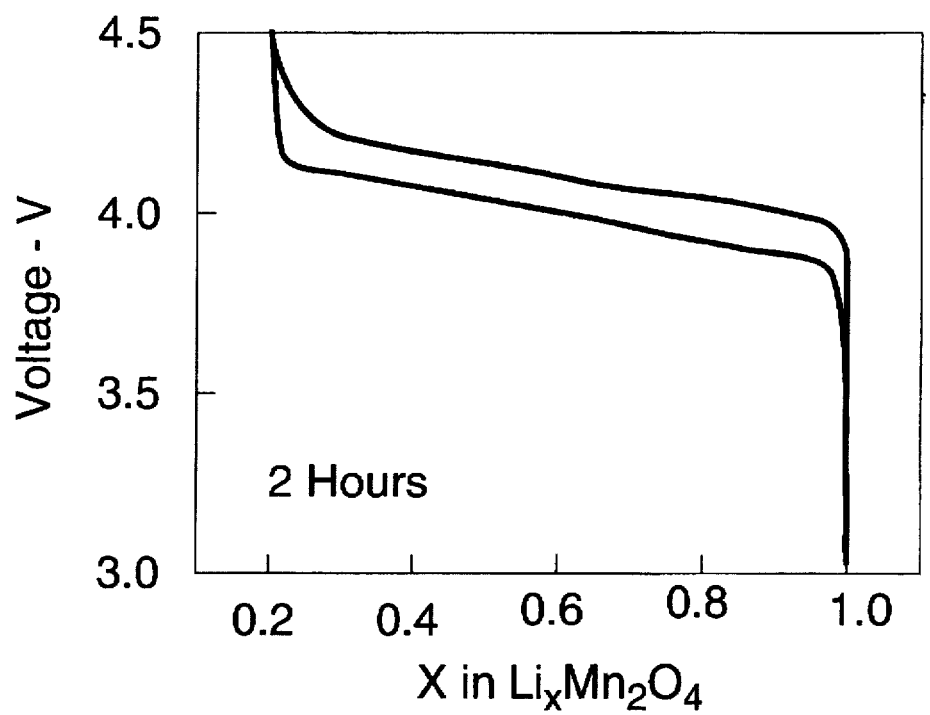
FIGS. 4–7 are graphs of the electrolytic performance of battery cells as represented by intercalated lithium as a function of charge/discharge voltage in $LiMn_2O_4$ positive electrodes having differing degrees of treatment according to the present invention.
Figure 5:
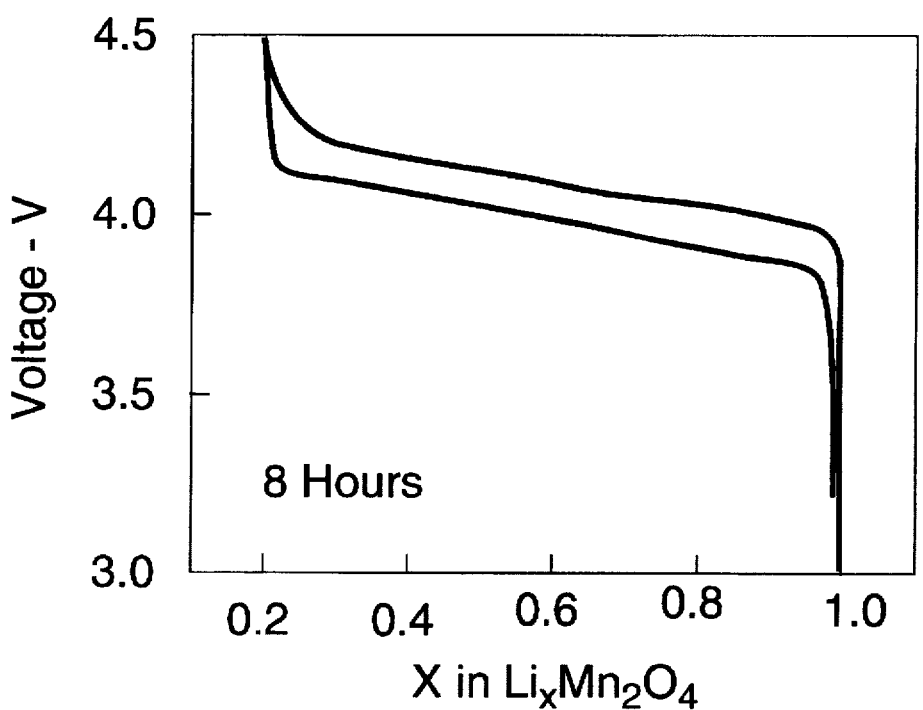
Figure 6:
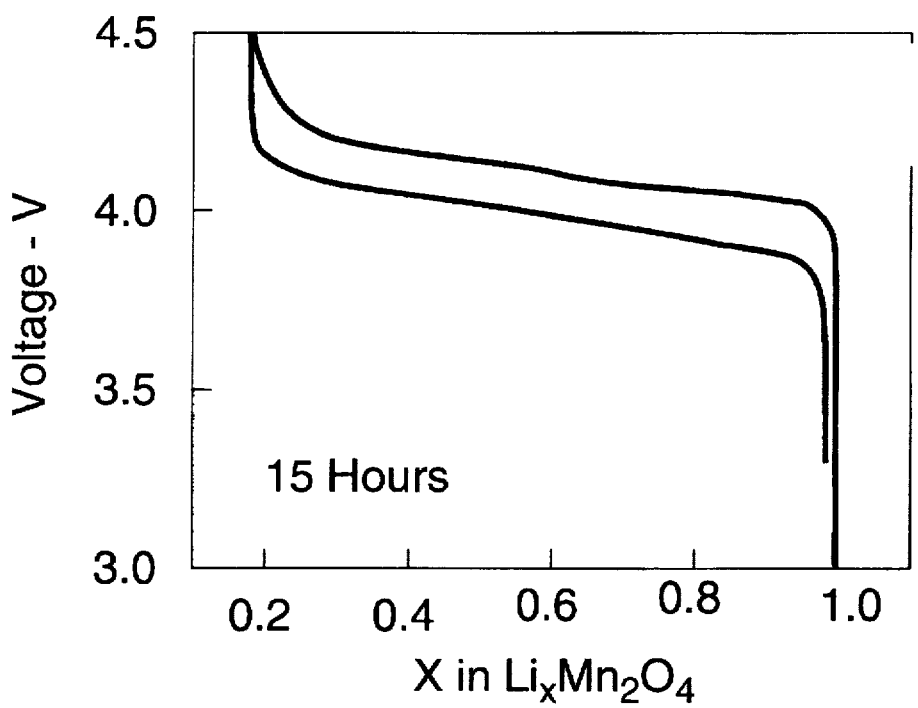
Figure 7:
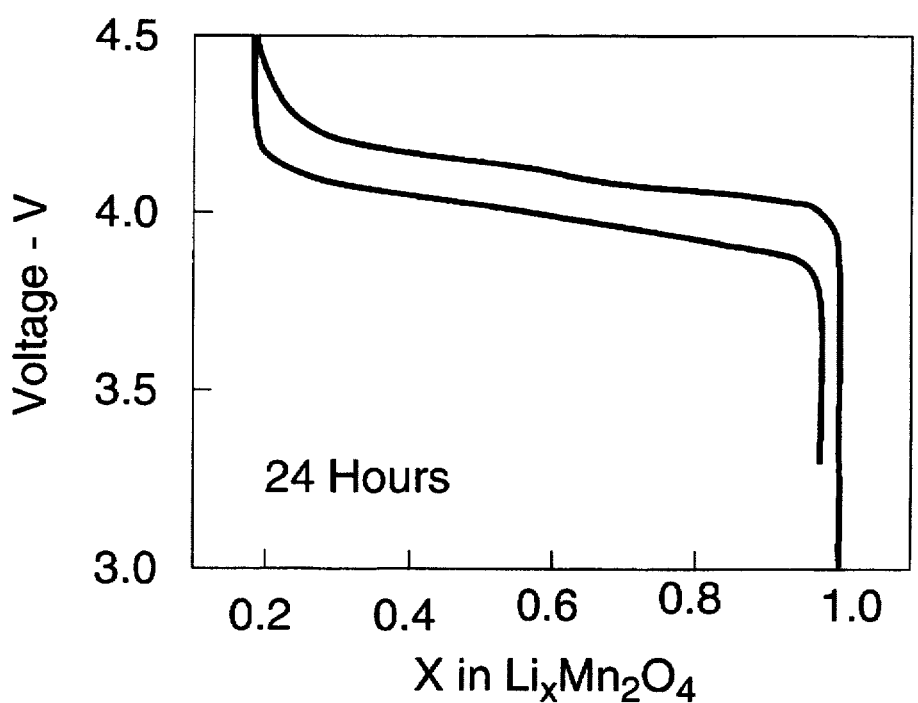

The efficacy of the chelation treatment in curtailing the normal catalytic action of $LiMn_2O_4$ was then tested by exposing the coated $LiMn_2O_4$ powder at about 450° C. to a 20 cm³/min flow of $N_2$ containing 4% $O_2$ and 5% CO on the premise that the extent of oxidation of the CO to $CO_2$ in the reaction:

$$CO + \tfrac{1}{2}O_2 \rightarrow CO_2$$

would provide an indication of the extent of catalysis by $LiMn_2O_4$. A similar test utilizing untreated $LiMn_2O_4$ powder provided a datum for the comparative evaluation. The results of these tests indicated that, indeed, the chelation treatment according to the invention decreased the generation of $CO_2$, and thus the catalytic activity of the $LiMn_2O_4$, by about 95%. A repeat of the treatment procedure in which the acetylacetone mixing operation was extended to about 5 hours produced similarly improved results, but showed a trend toward loss of such improvement with increased chelating reaction time. Results of these tests are depicted in FIG. 3 with reference to moles of $CO_2$ generated in the test.

Limitation of the catalytic action of a treated electrode compound on the oxidation of electrolyte did not alone establish that such a material could be effectively employed in a Li-ion battery cell, however. For this purpose, the electrolytic function of the electrode material, particularly in its support of the flow of $Li^+$ ions, must continue, uninhibited by the barrier effect of the carbonaceous coating. Efficacy of treated $LiMn_2O_4$ as a component of positive battery cell electrode compositions was therefore tested.

EXAMPLE 2

Portions of about 10 g of $LiMn_2O_4$ powder were treated at room temperature as in Example 1 with varying acetylacetone mixing times, namely, 2 h, 8 h, 15 h, and 24 h. The treated $LiMn_2O_4$ powders were then used, in typical formulations earlier-noted with respect to U.S. Pat. No. 5,460,904, to prepare positive electrodes for rechargeable lithium intercalation battery test cells. These cells were then subjected to charge/discharge cycling over the range of 3.3 V to 4.5 V at a constant 0.4 mA/cm² as described in that patent and their electrolytic performance over the first cycle was plotted as shown in FIGS. 4–7. The exhibited degree of irreversible capacity loss during this cycle indicated, on the basis of past performance experience, that practical battery cells would be produced with chelating agent contact of electrode material for periods of time up to about 12 hours, with the range of about 2 h to 8 h being generally preferred. Additional similar tests conducted with powders having greater specific surface area density, e.g., of about 3 m²/g, as well as with elevated chelating reaction temperatures, e.g., greater than about 50° C., confirmed that, as anticipated, comparable results may be achieved in substantially less time, e.g., 1 h v. 3 h, as a result of these variants.

EXAMPLE 3

Figure 8:
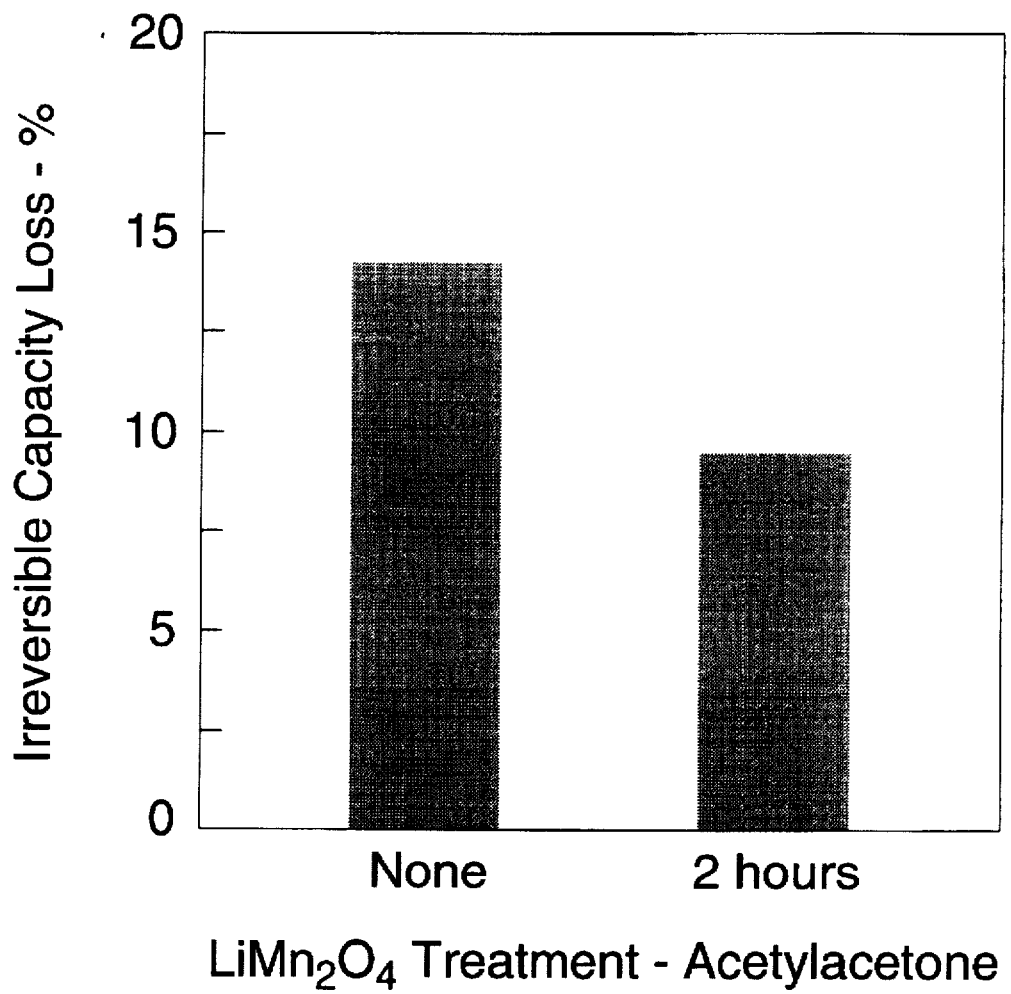
FIG. 8 is a chart of the comparative irreversible capacity loss of battery cells comprising $LiMn_2O_4$ positive electrodes having differing degrees of treatment according to the present invention.

To further ensure the utility of the present treatment process in maintaining battery capacity in longer-term applications, extended cycling tests were conducted. Test cells were prepared as described in Example 2 using untreated and 2 h-treated $LiMn_2O_4$ materials. These cells were then similarly subjected to five charge/discharge cycles at room temperature and, after a final charging, were stored at 55° C. for one week. After that period, the cells were discharged completely and then recharged one final time to provide data from which were calculated the irreversible component of the battery cell self-discharge suffered by the test cells during storage. These results are depicted in FIG. 8 and confirm the operational improvement obtained from chelating agent treatment in the preferred range of about 2 h to 8 h.

It is expected that other embodiments of the present invention will become apparent to those skilled in the art, and such embodiments are nonetheless intended to be within the scope of the invention as defined in the appended claims.

What is claimed is:

1. A rechargeable lithiated intercalation cell having reduced self-discharge, comprising a negative electrode, a nonaqueous electrolyte, and a positive electrode, wherein the positive electrode comprises a lithiated intercalation electrode, said lithiated intercalation electrode comprising a lithiated intercalation compound, said lithiated intercalation compound comprising an aggregate of particulates, the surfaces of said particulates having a passivating layer formed by chelating reaction with a chelating agent.

2. The rechargeable lithiated intercalation cell having reduced self-discharge according to claim 1, wherein said chelating agent comprises a bidentate, tridentate, quadridentate, pentadentate, hexadentate, or macrocyclic ligand.

3. The rechargeable lithiated intercalation cell having reduced self-discharge according to claim 2, wherein said bidentate ligand chelating agent comprises a dithiocarbamate, xanthate, carboxylate, tropolonate, ethylenediamine, 2,2'-bipyridine, 1,10-phenanthroline, o-phenylenebis(dimethylarsine), 1,2-bis(diphenylphosphine)ethane, β-diketonate, or salicylaldiminato.

4. The rechargeable lithiated intercalation cell having reduced self-discharge according to claim 2, wherein said tridentate ligand chelating agent comprises a terpyridene, acylhydrazone of salicylaldehyde, diethylenetriamine, or bis(3-dimethylarsinylpropyl)methylarsine.

5. The rechargeable lithiated intercalation cell having reduced self-discharge according to claim 2, wherein said quadridentate ligand chelating agent comprises a triethylenetetramine, β-diketonate Schiff base, or ligand of the type $X(-Y)_3$, wherein X is N, P, or As, wherein Y is $R_2N$, $R_2P$, $R_2As$, RS, or RSe, and wherein the connecting chain is $(CH_2)_2$, $(CH_2)_3$, or o-phenylene.

6. The rechargeable lithiated intercalation cell having reduced self-discharge according to claim 2, wherein said pentadentate ligand chelating agent comprises a monoprotonated ethylenediaminetetraacetate.

7. The rechargeable lithiated intercalation cell having reduced self-discharge according to claim 2, wherein said macrocyclic ligand chelating agent comprises a porphyrin, phthalocyanine, bis-dimethylglyoximato, or Schiff base.

8. The rechargeable lithiated intercalation cell having reduced self-discharge according to claim 1, wherein said lithiated intercalation electrode comprises $Li_xMn_2O_4$, where $0<x<2$, and wherein said chelating agent comprises acetylacetone.

9. The rechargeable lithiated intercalation cell having reduced self-discharge according to claim 8, wherein said reaction comprises contacting said particulates with said chelating agent for a time ranging from about 1.5 hours to about 24 hours.

10. The rechargeable lithiated intercalation cell having reduced self-discharge according to claim 9, wherein said reaction further comprises annealing at a temperature in excess of about 400° C.

11. A rechargeable battery cell comprising a negative electrode, a positive electrode, and an intermediate nonaqueous electrolyte characterized in that said positive electrode comprises a particulate lithium intercalation compound the electrode surface particles of which are coated with a passivating layer of a composition comprising the carbonaceous by-products of annealing the ligand of a multidentate chelating agent which has been reacted to form a chelate with said intercalation compound.

12. A rechargeable battery cell according to claim 11 characterized in that said chelating agent comprises a bidentate, tridentate, quadridentate, pentadentate, hexadentate, or macrocyclic ligand.

13. A rechargeable battery cell according to claim 11 characterized in that said lithiated intercalation electrode comprises $Li_xMn_2O_4$, where $0<x<2$, and said chelating agent comprises acetylacetone.

14. A method of making a rechargeable battery cell comprising a negative electrode, a positive electrode, and an intermediate non-aqueous electrolyte, which method comprises forming said positive electrode of a composition comprising a particulate lithium intercalation compound characterized in that a) said particulate lithium intercalation compound is intimately mixed with a multidentate ligand chelating agent to form a composition comprising a chelate of said intercalation compound with said ligand; and b) said chelate composition is annealed at a temperature in the range of about 400° C. to 800° C. to reduce said chelated ligand to carbonaceous by-products which coat the particulates of said lithium intercalation compound.

15. A method according to claim 10 wherein said lithiated intercalation electrode comprises $Li_xMn_2O_4$, where $0<x<2$, and said chelating agent comprises acetylacetone.

16. A method according to claim 15 wherein said lithium intercalation compound is mixed with said chelating agent for about 1.5 hours to about 8 hours and said chelate composition is annealed for about 24 hours.

* * * * *